Patented Dec. 9, 1952

2,621,164

UNITED STATES PATENT OFFICE 2,621,164

PREPARATION OF SULFONATED PHENOLIC RESINS

Daniel E. Nagy, Stamford, Conn., assignor to American Cyanamid Company, New York, N. Y., a corporation of Maine No Drawing. Application December 12, 1950, Serial No. 200,498

6 Claims. (Cl. 260—49)

This invention relates to an improved process for preparing synthetic resins of the sulfonated phenol-formaldehyde condensation product type.

Sulfited condensation products of phenols and aldehydes, principally formaldehyde, have long been known as tanning agents. They are generally prepared by condensing phenol or a bis phenol, which is an acid condensation product of a low degree of reaction of phenol and a carbonyl compound, with formaldehyde and a water-soluble salt of sulfurous acid in a single step under alkaline conditions. This one-step process has been found to possess certain disadvantages, the most important one being the excessively lengthy reaction period required, i. e., 24 hours and up. In addition, the products are generally rather highly colored and possess a relatively high salt content. Furthermore, the process is not always applicable when higher phenols than phenol itself or methylene diphenol are used.

I have found that similar but somewhat superior phenolic tanning agents may be prepared by a process taking only about one third the time. Moreover, this new process is substantially universally applicable to the reaction of formaldehyde and a sulfite with substituted phenols.

It is an object of the present invention to prepare a sulfonated phenol-formaldehyde condensation product by a new process.

Another object of the present invention is to prepare a sulfonated phenolic synthetic tanning agent which is light in color.

It is a further object of the present invention to prepare a sulfonated phenolic synthetic tanning agent having a low salt content.

Still another object of the present invention is the production of the ammonium salt of a sulfonated phenolic synthetic tanning agent.

The above and other objects are attained by condensing a phenol with formaldehyde under alkaline conditions, heating the condensation product obtained with a water-soluble salt of sulfurous acid, acidifying the sulfonated product to a pH of less than 1.5 with strong acid, and heating the acidified product until all reaction is complete as evidenced by formation of a product, the properties of which remain unchanged upon further heating.

The invention will be described in greater detail in conjunction with the following specific examples which are merely illustrative and not intended to limit the scope of the invention. Proportions are given in parts by weight unless otherwise noted.

Example 1

94 parts (1.0 mol) of phenol,
81.0 parts (1.0 mol) of 37% aqueous formaldehyde,
2.4 parts (0.06 mol) of sodium hydroxide,
20 parts of water,
3.6 parts (0.06 mol) of glacial acetic acid,
37.3 parts (0.2 mol) of sodium metabisulfite,
11.9 parts (0.12 mol) of 37% hydrochloric acid.

The sodium hydroxide is dissolved in the water, and the resulting solution is mixed with the phenol and heated to 85° C. The formaldehyde is then added over a 10-minute period and heating at 90° to 95° C. is continued for 45 minutes. All of the formaldehyde combines in less than 30 minutes.

The acetic acid and the sodium metabisulfite are added, and heating at 90° to 95° C. is continued for an additional 75 minutes at the end of which time all of the sulfite has reacted.

The resulting clear solution is cooled to 50° C. and the hydrochloric acid is added whereupon the pH of the solution becomes approximately 1. An exothermic reaction occurs and after it is over the solution is heated for an hour at 95° C.

The syntan is cooled, its pH adjusted to 3.0 with sodium hydroxide, 13 parts of glacial acetic acid are added and the final weight of the product is brought to 344 parts by addition of the requisite amount of water. 1 cc. of the syntan gives a clear solution in 10 cc. of water but is cloudy in 10 cc. of 1% sodium chloride solution.

Example 2

94 parts (1.0 mol) of phenol,
72.9 parts (0.9 mol) of 37% aqueous formaldehyde,
2.4 parts (0.06 mol) of sodium hydroxide,
25 parts of water,
3.6 parts (0.06 mol) of glacial acetic acid,
37.3 parts (0.2 mol) of sodium metabisulfite,
11.9 parts (0.12 mol) of 37% hydrochloric acid,
8.1 parts (0.1 mol) of 37% aqueous formaldehyde.

The procedure of Example 1 is followed up to and including the addition of the hydrochloric acid. When the exothermic reaction is over and the temperature is about 90° C., the second portion of the formaldehyde is added over a one-minute period and heating is continued for one hour.

The syntan is finished as in Example 1. Its solubility properties are similar to those of the product of Example 1 except that it is slightly less salt sensitive. 1 cc. of the syntan gives a clear solution in 10 cc. of water and in 10 cc. of a 1% salt solution and a cloudy solution in 10 cc. of a 2% salt solution.

Example 2 illustrates the fact that part of the formaldehyde may be added in the final stages of the syntan preparation.

*Example 3*

94 parts (1.0 mol) of phenol,
77.0 parts (0.95 mol) of 37% aqueous formaldehyde,
2.4 parts (0.06) mol of sodium hydroxide,
25 parts of water,
3.6 parts (0.06 mol) of glacial acetic acid,
37.2 parts (0.2 mol) of sodium metabisulfite,
11.9 parts (0.12 mol) of 37% hydrochloric acid,
4.05 parts (0.05 mol) of 37% aqueous formaldehyde.

The phenol and the 77 parts of the formaldehyde are heated in the presence of the sodium hydroxide in the water for one hour at 90° to 85° C. as in Example 1. The acetic acid is then added and heating is continued for one hour. The sodium metabisulfite is added and the resulting solution is heated for 2½ hours at the end of which time all of the sulfite has reacted.

The hydrochloric acid is then added at 50° C. and after about 15 minutes when the exothermic reaction is over the solution is heated to 90° C., the 4.05 parts of the formaldehyde are added, and heating is continued for one hour.

The pH of the syntan so obtained is adjusted from 1.0 to 2.9 with alkali, 13 parts of glacial acetic acid are added and the weight of syntan is brought up to 344 parts by addition of water. 1 cc. of the syntan forms a clear solution in 10 cc. of 1%, 2% or 3% salt solutions; 1 cc. of the syntan is cloudy in 10 cc. of a 4% salt solution. It thus appears that the syntan of the present example is definitely less salt sensitive than that of Example 1. This is believed to be due to the additional heat treatment at pH 7 before the addition of the sulfite.

*Example 4*

94 parts (1.0 mol) of phenol,
83.4 parts (1.03 mol) of 37% aqueous formaldehyde,
2.4 parts (0.06 mol) of sodium hydroxide,
25 parts of water,
3.6 parts (0.6 mol) of glacial acetic acid,
26.2 parts (0.14 mol) of sodium metabisulfite,
10.7 parts (0.11 mol) of 37% hydrochloric acid.

The procedure of Example 1 is used. 1 cc. of the syntan obtained gives a clear solution in 10 cc. of a 2% salt solution but precipitates in 10 cc. of a 3% salt solution.

*Example 5*

(a) 376 parts (4.0 mols) of phenol,
(b) 50 parts of water,
(c) 9.6 parts (0.24 mol) of sodium hydroxide,
(d) 334 parts (4.12 mols) of 37% aqueous formaldehyde,
(e) 14.4 parts (0.24 mol) of glacial acetic acid,
(f) 112.22 parts (0.59 mol) of sodium metabisulfite,
(g) 43.0 parts (0.443 mol) of 37% hydrochloric acid,
(h) 7.55 parts (0.118 mol) of sodium hydroxide,
(i) 25 parts of water,
(j) 40.0 parts of glacial acetic acid,
(k) 27.4 parts of liquid wattle extract containing 35% tannin,
(l) 1.4 parts of sodium metabisulfite,
(m) 357.2 parts of water.

(a) and (b)+(c) are charged to a suitable reaction vessel and heated to 85° C. (d) is added during a 10 to 15-minute period while the temperature is maintained at 85° to 90° C. Heating is continued at 90° to 95° C. for 45 minutes and the reaction mixture is cooled to 88° C. whereupon (e) and then (f) are added. Heating is continued for a half-hour at 85° to 90° C. and then at 90° to 95° C. until all of the sulfite is combined, i. e., about an hour.

The clear red solution obtained is cooled at 45° C. and (g) is added quickly in one portion to give a pH of 1 or less. This reaction is markedly exothermic and cooling is applied if needed so that 10 minutes after the addition the temperature is not over 90° C. After 5 more minutes, heating is begun and continued for 1½ hours at 90° to 95° C.

The clear viscous solution obtained is cooled to about 50° C. and neutralized to a pH of 3.1–3.4 with (h)+(i). If desired part of (m) may be added at this point. (l) is dissolved in part of (m), and (j), (k) and the solution of (l) are then added. The rest of the water (m) is then added to give the desired specific gravity. The liquid wattle extract (k) is added to stabilize the syntan against discoloration by light as described in my copending application, Serial No. 109,428 filed August 9, 1949.

*Example 6*

94 parts (1.0 mol) of phenol,
79.4 parts (0.98 mol of 37% aqueous formaldehyde,
2.4 parts (0.6 mol) of sodium hydroxide,
25 parts of water,
3.6 parts (0.06 mol) of glacial acetic acid,
26.2 parts (0.14 mol) of sodium metabisulfite,
11.3 parts (0.11 mol) of 37% hydrochloric acid,
4.1 parts (0.05 mol) of 37% aqueous formaldehyde.

The procedure of Example 3 is followed. 1 cc. of the syntan obtained gives a clear solution in 10 cc. of 2% salt solution and precipitates in 10 cc. of 3% salt solution.

In all of the foregoing examples the step of methylol phenol formation is combined with a heat treatment which carries the product beyond the water-soluble methylol stage and at the end of the first step of the process, i. e., condensing phenol with formaldehyde under slightly alkaline conditions, a water-insoluble resin results.

*Example 7*

94 parts (1.0 mol) of phenol,
2.4 parts (0.06 mol) of sodium hydroxide,
15 parts of water,
88.3 parts (1.09 mol) of 37% aqueous formaldehyde,
3.6 parts (0.06 mol) of glacial acetic acid,
23.8 parts (0.13 mol) of sodium metabisulfite,
9.5 parts (0.095 mol) of 37% hydrochloric acid.

The four first-listed ingredients are combined and heated to 85° C. The exothermic reaction which results is moderated by cooling, and heating is then continued at 93° C. for 1.5 hours. The acetic acid and sodium metabisulfite are then added and heating is continued for another hour at 94° C. after which the sulfite has reacted completely.

The reaction mixture is cooled to 60° C., the hydrochloric acid is added to give a pH of about 1, and after the exothermic reaction ceases, the mixture is heated at 90° C. for 2 hours. The syntan is neutralized to pH 3 with alkali and diluted as desired.

Example 8

94 parts (1.0) of phenol,
2.4 parts (0.06 mol) of sodium hydroxide,
5 parts of water,
81 parts (1.0 mol) of 37% aqueous formaldehyde,
3.6 parts (0.06 mol) of glacial acetic acid,
78.5 parts (0.36 mol) of 45% aqueous ammonium bisulfite solution,
14.2 parts (0.11 mol) of 10 N sulfuric acid.

The phenol, sodium hydroxide and water are heated together to 85° C., the formaldehyde is added, and heating is continued at 90°–95° C. for one hour and 10 minutes. The acetic acid and ammonium bisulfite are then added and heating is continued for two hours until all of the sulfite has reacted.

The reaction product so obtained is cooled to 60° C. and its pH adjusted to 1.2 by addition of the sulfuric acid. The acidified solution is heated for 2.5 hours and then cooled, its pH is raised to 3.5 with about 2.5 parts of sodium hydroxide dissolved in water, and 0.4 part of sodium metabisulfite is added to stabilize the syntan against discoloration by light as described in my copending application, Serial No. 109,427 filed August 9, 1949.

1 cc. of the syntan dissolves in 10 cc. of water but gives a cloudy solution in 10 cc. of 1% salt solution and a precipitate in 10 cc. of 2% salt solution.

Example 9

114 parts (0.5 mol) of isopropylidene di (p-phenol), 55 parts of water,
2.4 parts (0.06 mol) of sodium hydroxide,
68.8 parts (0.85 mol) of 37% aqueous formaldehyde,
57 parts (0.3 mol) of sodium metabisulfite,
3.6 parts (0.6 mol) of glacial acetic acid,
11.8 parts (0.12 mol) of 37% hydrochloric acid.

The formaldehyde is added to a mixture of the water, sodium hydroxide and isopropylidene di (p-phenol) over a 10-minute period at 92° C. After 40 minutes at about that temperature, the acetic acid, the sodium metabisulfite and 45 parts of water are added and heating is continued for 5 hours until all of the sulfite is reacted.

The solution is cooled, acidified to a pH of 1.0 with the hydrochloric acid and then heated at 95° C. for 2½ hours. Before the acid addition the syntan is not completely water-soluble; after the addition it dissolves in water and a 1 cc. sample gives a clear solution in 10 cc. of a 9% salt solution.

The finished syntan is cooled, and alkali is added to adjust the pH to 4.0.

Example 10

(a) 114.0 parts (0.5 mol) of isopropylidene di (p-phenol),
(b) 55.0 parts of water,
(c) 2.4 parts (0.06 mol) of sodium hydroxide,
(d) 68.8 parts (0.85 mol) of 37% aqueous formaldehyde,
(e) 56.9 parts (0.3 mol) of sodium metabisulfite,
(f) 45.0 parts of water,
(g) 12.0 parts (0.12 mol) of 37% hydrochloric acid,
(h) 2.4 parts (0.06 mol) of sodium hydroxide,
(i) 1 part of glacial acetic acid,
(j) 73.0 parts of water.

(a) is added to a solution of (c) in (b) which is being heated from 40° to 60° C. At 60° to 65° C. (d) is added during a 10 to 15-minute period, and the temperature is maintained within a maximum range of 72° to 85° C. for about an hour. (e) and (f) are then added and heating is continued at 90° to 95° C. until all of the sulfite is combined, i. e., about 2 hours. The reaction mixture is cooled to 85° C. whereupon (g) is added to obtain a pH of 1. After 10 minutes, heating is started and the solution is heated for 2 hours at 90° to 95° C. It is then cooled to 45° C. and its pH is adjusted first with alkali (h) to 4.5 to 5.0 and then with acid (i) to 4.0–4.2. Water (j) is then added to give a final weight of 430.5 parts.

Example 11

(a) 114.0 parts (0.5 mol) of isopropylidene di (p-phenol),
(b) 55.0 parts of water,
(c) 2.4 parts (0.06 mol) of sodium hydroxide,
(d) 68.8 parts (0.85 mol) of 37% aqueous formaldehyde,
(e) 56.9 parts (0.3 mol) of sodium metabisulfite,
(f) 45.0 parts of water,
(g) 12.0 parts (0.12 mol) of 37% hydrochloric acid,
(h) 0.5 part of sodium hydroxide,
(i) 17.6 parts of glacial acetic acid,
(j) 55.4 parts of water.

The procedure of Example 10 is followed up to and including the two-hour heating at pH 1. The solution is then cooled to 45° C. and its pH adjusted to 2.0 by addition of alkali (h). Acid (i) and water (j) are then added so that the final pH of the syntan is from 2.0 to 2.5.

Example 12

(a) 114 parts (0.05 mol) of isopropylidene di (p-phenol),
(b) 55.0 parts of water,
(c) 3.6 parts (0.09 mol) of sodium hydroxide,
(d) 68.8 parts (0.85 mol) of 37% aqueous formaldehyde,
(e) 56.9 parts (0.3 mol) of sodium metabisulfite,
(f) 45.0 parts of water,
(g) 15.0 parts (0.15 mol) of 37% hydrochloric acid,
(h) 2.0 parts (0.05 mol) of sodium hydroxide,
(i) 28.0 parts of 70% glycolic acid,
(j) 42.3 parts of water.

The procedure of Example 10 is followed up to and including the two-hour heating period at pH 1 after addition of the hydrochloric acid. The reaction mixture is then cooled to 45° C. and alkali (h) dissolved in some of water (j) is added to adjust the pH to 1.8–2.2 (i) and the remainder of (j) are then added.

Example 13

61 parts (0.5 mol) of p-ethyl phenol,
54 parts (0.67 mol) of 37% aqueous formaldehyde,
1.2 parts (0.03 mol) of sodium hydroxide,
4 parts of water,
1.8 parts (0.03 mol) of glacial acetic acid,
31.8 parts (0.17 mol) of sodium metabisulfite,
100 parts of water,
11.9 parts (0.12 mol) of 37% hydrochloric acid,
3.6 parts (0.09 mol) of sodium hydroxide,
7 parts of water.

The 1.2 parts of sodium hydroxide are dissolved in 4 parts of water, and the resulting solution is heated with the p-ethyl phenol to 85° C. The formaldehyde is then added and the mixture is heated for two hours at 94° C. The 100 parts of water, the acetic acid and the sodium metabisulfite are then added and heating is continued for four hours after which the sulfite is all reacted. The solution is cooled to 60° C., acidified with the hydrochloric acid to a pH of about 1, slowly heated to 90° C. and then further heated at that temperature for three hours. A sample of the resin then gives a homogeneous cloudy solution in water which becomes almost clear on heating.

The product is cooled and neutralized with the 3.5 parts of sodium hydroxide dissolved in the 7 parts of water. The product is a thick white material containing precipitated syntan which is somewhat soluble in hot water as indicated above.

Example 14

206 parts (1.0 mol) of a commercial p-octyl phenol which is a mixture of isomers,
83.4 parts (1.03 mol) of 37% aqueous formaldehyde,
12 parts (0.3 mol) of sodium hydroxide,
100 parts of water,
29.8 parts (0.16 mol) of sodium metabisulfite,
16 parts (0.27 mol) of glacial acetic acid,
41.5 parts (0.42 mol) of 37% hydrochloric acid.

The p-octyl phenol, water and alkali are heated to 60° C., the formaldehyde is added, and the reaction mixture is heated for two hours at 68° to 70° C. The acetic acid, the metabisulfite and the 100 parts of water are then added, and heating at 95° C. is continued for four hours.

The reaction mixture is cooled, the hydrochloric acid is added and heating at 90° C. is continued for four hours. Excess alkali is neutralized and the cooled insoluble syntan is filtered and washed with water.

The solid powdery syntan is completely soluble in solvents such as toluene. It is also soluble in about 2 parts of a sulfated oil which mixture gives a slightly cloudy solution in water.

Example 15

75.6 parts (0.3 mol) of a commercial p-dodecyl phenol which is a mixture of isomers,
32.4 parts (0.4 mol) of 37% aqueous formaldehyde,
3.6 parts (0.09 mol) of sodium hydroxide,
25 parts of water,
5.4 parts (0.09 mol) of glacial acetic acid,
19.0 parts (0.1 mol) of sodium metabisulfite,
15 parts of water,
14.3 parts (0.14 mol) of 37% hydrochloric acid.

The sodium hydroxide, phenol, formaldehyde, and 25 parts of water are heated together for 3½ hours at about 70° C. The acetic acid is added and the mixture is heated to 90° C. for one hour. The sodium metabisulfite and 15 parts of water are then added and heating is continued for about four hours.

The hydrochloric acid is added and heating again continued for an additional four hours. When a sample of the material obtained is diluted with water it becomes partly emulsified therein.

The reaction mixture is neutralized with alkali and 188 parts of sulfonated oil are added. The mixture is stirred and then allowed to stand until separation into two layers enables withdrawal of the lower water layer. The upper, dark-brown oil layer gives a completely clear solution upon addition of sufficient water.

Example 16

63 parts (0.5 mol) of p-chlorophenol,
53.3 parts (0.67 mol) of 37% aqueous formaldehyde,
7.2 parts (0.18 mol) of sodium hydroxide,
35 parts of water,
10.8 parts (0.18 mol) of acetic acid,
31.7 parts (0.17 mol) of sodium metabisulfite,
100 parts of water,
23.8 parts (0.24 mol) of 37% hydrochloric acid.

A portion of the p-chlorophenol, i. e., 42.2 parts, is dissolved in a solution of the sodium hydroxide in 35 parts of water, and the resulting solution is heated with the formaldehyde for five hours at 68° C. The rest of the p-chlorophenol is then added and heating is continued for three hours. The acetic acid is added and heating is again continued at 90° C. for two hours whereupon the sodium metabisulfite and 10 parts of water are added. The mixture is again heated for four hours at 90° to 95° C. The hydrochloric acid is added to acidify the solution to a pH of about 1, and heating is then continued for three hours. During this heating period, about 14.5 parts of insoluble resinous material is precipitated and removed. The remaining solution is neutralized with alkali and when cooled it sets up to a gelatinous semi-solid material which is almost insoluble in water.

The syntans prepared in accordance with the present invention as illustrated by the foregoing Examples 1 through 16 may be used alone or in combination with other tanning agents including vegetable tannins and chrome tanning agents. They may be used for their tanning properties or if desired, in smaller amounts, for their bleaching properties. Typical applications are illustrated by the following examples.

Example 17

Heavy hides which have been limed, unhaired and bated in the usual fashion are treated in a rocker with a total of 100 lbs. of syntan for each 100 lbs. of white weight of hide. The syntan is one prepared as in Example 5, the pH of which has been adjusted to about 5.0, and the tanning procedure used is as follows: 30 lbs. of each 100 lbs. of syntan to be used are added to the hides in the rocker and eight hours later a second 30 lbs. are added. About 16 hours later the final 40 lbs. are added and rocking is continued for 2–3 days until the syntan is absorbed. Sulfuric acid is added in small portions throughout a 36-hour period until the stock has a pH of about 3.5. The skins are now completely tanned but may, if added weight is desired, be put in the layer vats with the above syntan or with the customary vegetable tannins.

The process of Example 7 yields very full firm leathers in less time than is normally required for tanning heavy leather in the rockers with conventional materials. The usual longer rocker system may also be used with the syntan as the sole component or in admixture with vegetable tans.

The syntan imparts added firmness and plumpness to the leather and lightens its color when used in conjunction with vegetable tannins. When the syntan of the present invention is used alone, the leather is extremely light in color.

Example 18

100 lbs. of drained pickled sheepskins floated with 100 lbs. of 2.5% salt solution are tanned with 75 lbs. of the syntan prepared in Example 3. The syntan, dissolved in 100 lbs. of 2.5% salt solution, is added to the drum in 3 equal feeds 15 minutes apart. After drumming for four hours the skins are allowed to remain in the liquor for about 15 to 18 hours. The skins are than drummed for 15 minutes, washed, colored, and fatliquored.

The finished skins are very soft and are characterized by an exceptionally strong fiber.

Mixtures of the syntans of the present invention with vegetable tannins may be used in the manner described above.

Example 19

Pickled cowhides which have been tanned with a basic chromium sulfate and split and shaved in the customary manner may be treated as follows:

The shaved hides are put in the drum and washed for 15 minutes to 120° F. They are then drummed for one hour with 15% of a syntan prepared as described in Example 4 at 120° F.

The skins thus treated are well-filled and no longer have the empty flat characteristics of chrome tanned leather. In addition, they are well bleached and in a suitable condition for dyeing to the lightest pastel shades.

Example 20

Example 19 is repeated using a syntan prepared as in Example 9. A white leather having superior light resistance is obtained.

Example 21

Example 19 is repeated using the syntan-sulfonated oil mixture as prepared in Example 15.

Only 4% of the mixture is required to give a combination retannage and fatliquor. The skins are characterized by a greenish rather than a bluish cast and have a dry feel rather than the usual slightly greasy feel of ordinary chrome fatliquored leather.

Formaldehyde may be used in either the form of aqueous solutions such as formalin or in the anhydrous form as paraformaldehyde in my new process.

The present process contemplates the preparation of sulfonated formaldehyde condensation products of phenol itself and any alkylated or halogenated phenol which contains at least two unsubstituted ortho and para positions, preferably two ortho positions. Thus, alkylated phenols having from 1 to 20 carbon atoms in the alkyl group or groups, such as o-cresol, m-xylol, the p-octylphenols, the p-dodecyl phenols, p-ethyl phenol, and the like, may be used. In addition, it is within the contemplation of my invention to use halogenated phenols having the necessary free ortho and/or para positions such as p-chlorophenol, o-bromophenol, and the like. The low molecular weight condensation products of these phenols with formaldehyde or other aldehydes or ketones in the presence of acid, i. e., the corresponding bis phenols, may also be used. It will be noted that all of the above-disclosed phenols may be classed as monohydric phenols and reaction products produced therefrom. By this is meant a phenol which contains only one nuclear hydroxyl group for each benzene nucleus. Thus, while methylene diphenol, commonly known as bis phenol, contains two phenolic hydroxyls, each is attached to a different benzene group and therefore the compound may rightfully be termed a monohydric phenol.

The solubility of the resin prepared will vary with the particular phenol used. Thus, while phenol itself, bis phenol and o-cresol form soluble products, the p-octylphenols and the p-dodecyl phenols form insoluble products. Others such as p-ethyl phenol and the halogenated phenols produce products of an intermediate solubility. The water-soluble products are preferred for use as syntans but even the water-insoluble products may be so used.

Any water-soluble salt of sulfurous acid may be used in the sulfonation step which, in itself, is perfectly conventional. Thus, instead of the sodium metabisulfite and ammonium bisulfite of the examples, I may use other alkali metal or ammonium bisulfites, i. e., potassium metabisulte or ammonium metabisulfite, or I may use sodium bisulfite, sodium sulfite, potassium bisulfite, potassium sulfite, ammonium sulfite, or mixtures of two or more different salts of sulfurous acid such as, for example, a mixture of sodium bisulfite and sodium sulfite. The phenol-formaldehyde condensation product and the sulfonating agent are heated together at a temperature of from about 75°–100° C.

The proportions of reactants are important in obtaining desired properties of end product. For the production of resins suitable for use as syntans, the molar ratio of phenol to formaldehyde should vary between 1:1.5 to 1:0.9 and that of phenol to sulfite, based on $SO_2$, from about 1:1 to 1:0.15, moreover, the particular ratios selected must provide more formaldehyde than $SO_2$ so that there is enough formaldehyde present to combine with the $SO_2$ and, in addition, to link the phenols together. In general, reaction of about 1 mol of formaldehyde, and this includes slightly less and slightly more, with each mol of phenol will provide the desired combined ratio. Similarly, for every $SO_2$ anywhere from 1 to 6 phenols may advantageously be provided.

It is desirable, although not necessary, that the heating operation in the first step of my process, i. e., the condensation of phenol with formaldehyde, be effected under such conditions that the reaction product be substantially completely insoluble, i. e., at least about 95%, in water. For this reason, the upper portion of the range of about 50° to 100° C. is preferred.

The third step in my process comprises the essence of the invention. It is essential to my process that the sulfonated phenolformaldehyde condensation product be treated with a quantity of a strong acid such as hydrochloric acid, sulfuric acid, and the like, sufficient to reduce the pH of the reaction mixture to less than about 1.5. This step is believed to be responsible for conversion of any remaining methylol or methylene ether groups in the sulfonated phenolformaldehyde condensation product to methylene linkages. The heating which follows acidification to a pH of less than about 1.5 is carried on at a temperature within the range of about 50° to 100° C. which is sufficiently high to effect substantially complete conversion to the methylene linkages. The completion of this conversion which is the endpoint of the reaction is readily recognized for it is that point beyond which further heating effects no change in the properties of the final product.

In the application of the present process to the preparation of water-soluble condensation products such as those using phenol itself or bis phenol, heating the sulfonated phenol-formaldehyde condensation product at a pH of from about 4 to 8 for as long as 6 to 8 hours will not give a soluble material. Only when the pH is lowered to about 1 as in the present case and the acidified product heated for up to about 2 hours does the product have maximum solubility.

Moreover, the acid treatment of the third step of my process changes the original red color of the condensation product to a light lemon yellow. This is, of course, most advantageous when the products are to be used as tanning agents. Furthermore, when they are used as tanning agents the leather obtained is full and soft and has a high shrink temperature as compared with the hard boardy leathers of low shrink temperature which are obtained when a similar sulfonated phenolic syntan not subjected to the acid treatment which features my new process is used.

As pointed out above, the most important advantage of my new process is the relatively short time required for the preparation of valuable synthetic tanning agents materials. To make an equivalent syntan by the old one-step method requires a total of at least 24 hours whereas my new process requires less than eight hours in most cases.

While I do not wish to be limited to any particular theory of the mechanism of the reactions which take place in my process, I believe that in the first step methylol phenols and phenol methylene ethers are formed. In the second step the sulfite reacts with methylol and/or methylene ether groups. In the final third step, any remaining intermediate linkages are converted to those of the methylene type. To a considerable extent the success of my new process depends upon the hitherto unrecognized fact that sulfites will react with methylene ether groups as well as with methylol groups.

I claim:

1. A process for preparing a water soluble syntan which comprises: (1) heating formaldehyde with a phenol selected from the group consisting of (1) a monohydric phenol which is unsubstituted in at least two of the ortho and para positions and which may contain in addition to the hydroxyl oxygen only carbon, hydrogen and halogen (2) a bis phenol produced by reacting a monohydric phenol which is unsubstituted in at least two of the ortho and para positions and which may contain in addition to the hydroxyl oxygen only carbon, hydrogen and halogen with an aldehyde under acid conditions and (3) a bis phenol produced by reacting a monohydric phenol which is unsubstituted in at least two of the ortho and para positions and which may contain in addition to the hydroxyl oxygen only carbon, hydrogen and halogen with a ketone under acid conditions at about 50°–100° C. under alkaline conditions, in the absence of any salt of sulfurous acid until substantially all the formaldehyde is combined and until the reaction has gone beyond the water soluble methylol stage, the ratio of phenol to formaldehyde ranging from about 1:1.5 to 1:0.9; (2) heating the condensation product so obtained at about 75°–100° C. at a pH of from about 4 to 10 with a water-soluble salt of sulfurous acid until substantially all of the sulfite is combined, the ratio of phenol to $SO_2$ ranging from about 1:1 to 1:0.15, there always being sufficient formaldehyde supplied for reaction with all of the $SO_2$ and for linking together of the phenol groups; (3) adding a strong acid to the reaction mixture until its pH is below about 1.5; and (4) heating the strongly acid solution at a temperature of from about 50° C. to 100° C. which is sufficiently high to convert substantially all methylol and methylene ether groups present in the sulfonated phenol-formaldehyde condensation product to methylene groups in about one to two hours wherein the mol ratio of the formaldehyde to $SO_2$ present in the reaction product varies directly with one another between about 0.9:0.15 to 1.5:1, respectively.

2. A process according to claim 1 in which the phenol is isopropylidene di(p-phenol).

3. A process according to claim 1 in which the phenol is p-chlorophenol.

4. A process according to claim 1 in which the phenol is p-octyl phenol.

5. A process according to claim 1 in which the phenol is p-dodecyl phenol.

6. A process for preparing a water soluble syntan which comprises: (1) heating formaldehyde with phenol at about 50°–100° C. under alkaline conditions, in the absence of any salt of sulfurous acid until substantially all the formaldehyde is combined and until the reaction has gone beyond the water soluble methylol stage, the ratio of phenol to formaldehyde ranging from about 1:1.5 to 1:0.9; (2) heating the condensation product so obtained, which is substantially completely insoluble in water, at about 75°–100° C. at a pH of from about 4 to 10 with a water-soluble salt of sulfurous acid until substantially all of the sulfite is combined, the ratio of phenol to $SO_2$ ranging from about 1:1 to 1:0.15, there always being sufficient formaldehyde supplied for reaction with all of the $SO_2$ and for linking together of the phenol groups; (3) adding a strong acid to the reaction mixture until its pH is below about 1.5; and (4) heating the strongly acid solution at a temperature of from about 50° C. to 100° C. which is sufficiently high to convert substantially all methylol and methylene ether groups present in the sulfonated phenol-formaldehyde condensation product to methylene groups in about one to two hours wherein the mol ratio of the formaldehyde to $SO_2$ present in the reaction product varies directly with one another between about 0.9:0.15 to 1.5:1, respectively.

DANIEL E. NAGY.

REFERENCES CITED

The following references are of record in the file of this patent:

UNITED STATES PATENTS

| Number | Name | Date |
|---|---|---|
| 2,195,196 | Wassenegger | Mar. 26, 1940 |
| 2,357,798 | Niederhauser | Sept. 12, 1944 |